May 12, 1942.  A. W. SMITH  2,282,430
DISPLAY DEVICE
Filed July 22, 1940     2 Sheets-Sheet 1

INVENTOR.
ALBERT W. SMITH
BY
ATTORNEY.

May 12, 1942.　　　A. W. SMITH　　　2,282,430
DISPLAY DEVICE
Filed July 22, 1940　　　2 Sheets-Sheet 2
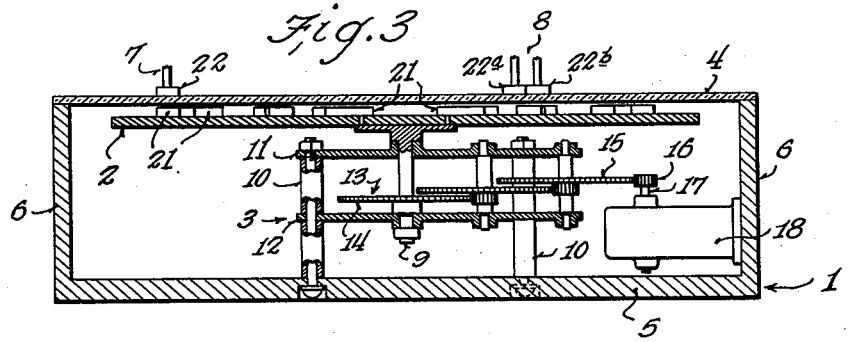
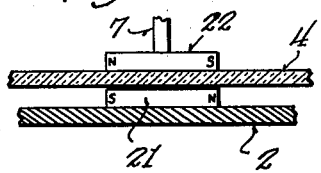
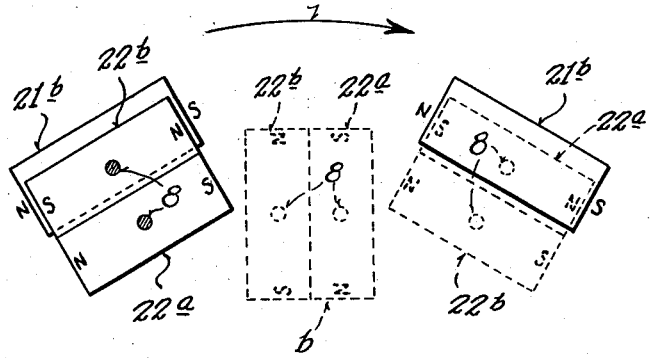
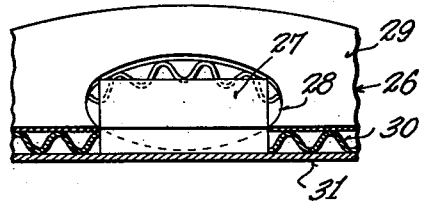
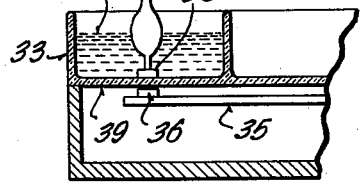
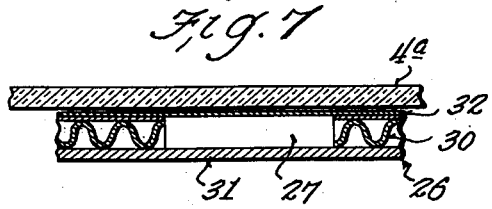
INVENTOR.
ALBERT W. SMITH
BY
ATTORNEY.

Patented May 12, 1942

2,282,430

UNITED STATES PATENT OFFICE 2,282,430

DISPLAY DEVICE

Albert W. Smith, Milwaukee, Wis., assignor to Nestor Johnson Manufacturing Company, Chicago, Ill., a corporation of Illinois Application July 22, 1940, Serial No. 346,755

4 Claims. (Cl. 46—45)

This invention relates to improvements in display devices for advertising purposes.

The invention has particular reference to display devices which magnetic means are employed to motivate the display figures or equivalent elements in a given path of travel over the supporting surface of the device.

In connection with the above, the principal object and purpose of my invention is to attain this movement through the provision of permanent magnets, one on a turntable or other movable member below said surface and the other on a display figure above said surface, said magnets serving by their mutual attraction when opposed to hold the figure in its display position on said surface and to cause the figure to be moved over said surface in response to the movement imparted to the magnet on the turntable in the rotation thereof.

A further object of my invention is to have the permanent magnet on the figure serve as the support for the figure and slidably mount the figure on the supporting surface of the display device so that the figure may be readily and easily moved over said surface in response to the rotation of the turntable or equivalent means below said supporting surface.

A further object of my invention is to attain by the use of permanent magnets on the figure and the turntable a whirling or waltzing action for one or more of the display figures, and thereby accomplish this motion without the need for any mechanical connection between the figure and the turntable or other rotary part.

In carrying out the foregoing object, I employ the factor of the attraction and repulsion in respect to the like and unlike poles of the magnets as will hereinafter more fully appear.

The invention consists further in the features hereinafter described and claimed.

In the accompanying drawings:

Fig. 3 is a vertical sectional view taken on line 3—3 of Fig. 2;

Fig. 4 is a vertical sectional view showing the disposition of a permanent magnet on a display figure and a permanent magnet on the turntable to impart movement to the figure over the top wall or supporting surface of the device in the rotation of the turntable;

Fig. 5 is a diagrammatic view illustrating the manner in which a display figure may be made to turn about a vertical axis by the use of permanent magnets in accordance with my invention;

Fig. 6 is a fragmentary perspective view partially in section of a modified form of turntable to be later described;

Fig. 7 is a sectional view of a further modification of the turntable construction; and Fig. 8 is a vertical sectional view of a further modification in respect to the supporting medium for the display figures.

Figure 1:
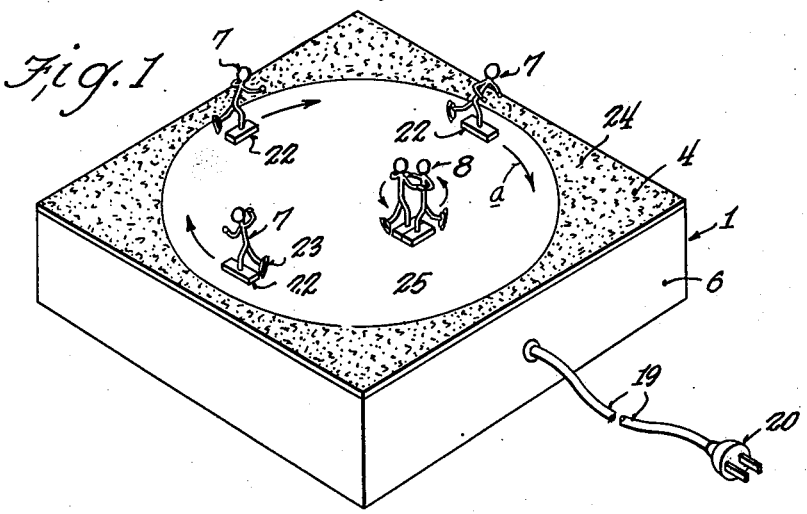
Fig. 1 is a perspective view of a display device constructed in accordance with my invention.

In the embodiment of my invention shown in Figs. 1 to 5 of the drawings, 1 indicates a box like element constituting the base of the display device and providing a housing for the turntable 2 and its driving mechanism 3.

The housing 1 has top and bottom walls 4, 5 and upright marginal walls 6. The top wall 4 provides a supporting surface for the several display figures used with the device, a few of such figures being shown in Fig. 1 and there indicated at 7, 8 respectively. The top wall 4 is made of a non-magnetic material, glass being shown in the drawings. Any suitable means may be employed for holding the wall 4 on the top of the base 1, the contemplation being that the top wall 4 should be at least co-extensive in area with the turntable 2.

Figure 2:
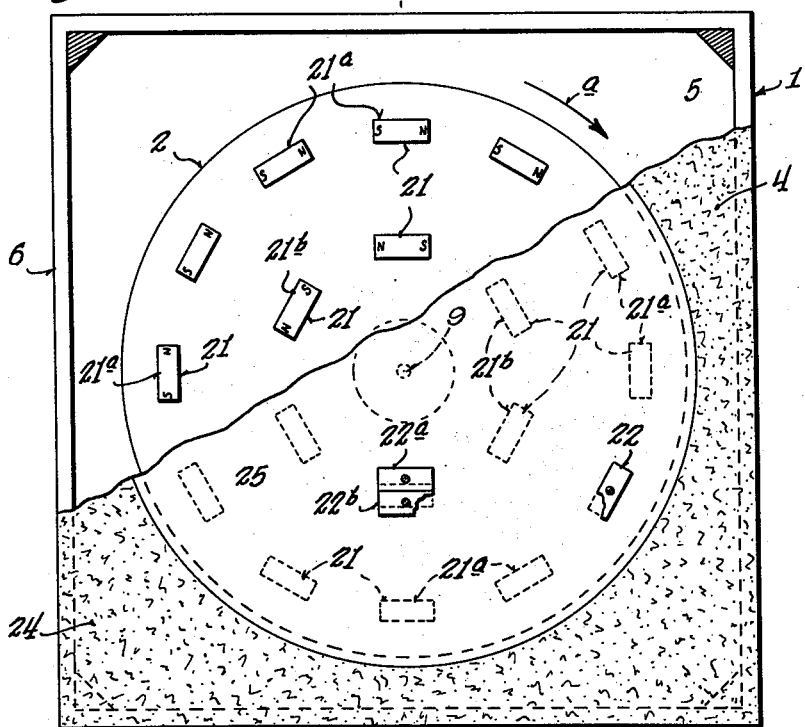
Fig. 2 is a top plan view of said device, the top wall of the device which supports the display figures being broken away to more clearly show the turntable therebelow.

The turntable 2 is also made of a non-magnetic material. This may be Bakelite, fiber, paper stock or the like. The turntable 2 is circular as shown in Fig. 2 and is disposed in a substantially horizontal position below the glass plate 4 for rotation about a vertical axis substantially normal to said plate. To accomplish this the turntable 2 is mounted on the upper end of a vertical shaft 9 suitably journalled and supported in an upright position in the driving fixture 3.

In the embodiment shown in Fig. 3, this fixture has upright supports 10, 10 secured at their lower ends to the bottom wall 5 of the base 1 and supporting horizontal bracket members 11, 12 in super-imposed, but spaced positions above said bottom wall. The shaft 9 is supported by and journaled in said bracket members for rotation by a gear train marked generally at 13 in Fig. 3. The terminal gears of said train comprise a gear wheel 14 fixed on the shaft 9 and a gear wheel 15 which meshes with a pinion 16 fixed on the armature shaft 17 of the electrically operated driving motor 18. The latter is located in the base 1 of the device and is furnished with an electric current through a supply cable 19 which extends out of the box 1 and is equipped with a conventional contact plug 20 as shown in Fig. 1. It is preferable that the supply cable 19 extend out of the box 1 through one of its upright marginal walls 6 as shown. It is to be understood that the motor 18 when in operation rotates the turntable 2 through the gear train 13, the latter serving both as a driving and reducing gear. The turntable is fixed to the shaft 9 and is rotated thereby at the relatively slow speed required for the display figures 7, 8. Due to the fact that any suitable power and drive arrangement may be employed to rotate the turntable 2, it is not deemed necessary to further describe the particular gear train 13 herein disclosed. It is thought sufficient to say that the gears between the terminal gears specifically referred to are located between the bracket members 11, 12 and have their shafts journaled in and supported by said members as shown in Fig. 3. The bottom wall of the box and the upright marginal walls as well may be provided with vent openings so that air may circulate within the box to cool the motor 18.

Arranged on the upper surface of the turntable 2 in the embodiment shown are a plurality of permanent magnets 21, 21. These magnets are of the bar type, that is, they are relatively straight pieces of permanently magnetized metal. As shown in Fig. 2, the permanent magnets 21 are arranged in two concentric rows, the magnets 21a of the outer row being disposed adjacent the periphery of the turntable 2, while the magnets 21b of the inner row are closer to the center of the turntable. Also as shown in Fig. 2, the magnets 21a of the outer row are arranged on the turntable 2 with the poles of one sign facing in one direction and the poles of the opposite sign facing in the opposite direction. As to the inner row, the magnets may be reversely arranged, that is, the magnets of the inner row are arranged with the poles of one sign facing in the direction of the poles of the opposite sign of the magnets in the outer row. Specifically, the magnets 21a in the outer row are arranged with their north poles all facing in the direction of rotation of the turntable 2 as indicated by the arrow a. This faces the south poles of the magnets 21a against the direction of rotation of the turntable. The magnets 21b of the inner row are arranged with their south poles facing the direction of rotation of the turntable, while their north poles face against the direction of rotation. The purpose of this reverse arrangement will presently appear.

The display figures used with the device are marked 7 and 8 in Fig. 1, and may be given the form desired for the particular display being used. When the display device is used for advertising a manufactured product, such, for example, as ice skates, the display figures 7 and 8 will be made to represent skaters. The size of the figures will be in proportion to the size of the display device. In practice, the figures will be somewhat miniature in size and each figure will be in a posture indicating a skating action or movement.

The figures are supported on the upper surface of the glass plate 4. The support 22 for each figure is in the form of a permanent bar magnet of the same size and polarity as the magnets 21a, 21b carried by the turntable 2. In the embodiment shown, the permanent magnets 22 not only support the figures in an upright position, but constitute a sliding foot support for the figures on the plate 4 as shown herein. Hence, for a skating figure, the magnet 22 is at one foot of the figure, while the other foot is equipped with an ice skate representation marked 23 in the drawings. As both will have a metal appearance, the figure will appear to be equipped with a pair of skates. In practice, the magnet 22 will have sufficient mass and be wide enough to support the figure on the plate 4 against tipping at all times.

To make the display device realistic, the upper surface of the glass plate 4 about the boundary of the turntable 2 is painted or otherwise treated to represent a layer of snow as indicated at 24 in Fig. 1. The inner area 25 of the plate 4 may be treated to represent a sheet of ice. This effect may also be accomplished by covering the under side of the glass plate 4 with a coating or layer of paper of suitable color and pattern. In all cases, the plate 4 covers from view the turntable 2 and the driving mechanism therefor within the box or casing 1 and hence, to the observer there is no apparent means for giving motion to the display figures on the skating area 25 of the plate in the operation of the device. Also the figures may be dressed or represented in skating costumes, and to give variety, colors may be used and no two figures need be alike in skating posture.

The display figures are caused to slide or glide over the upper surface of the plate 4 in the area 25 by the magnetic attraction between the magnets 21 on the turntable 2 and the magnets 22 on the figures 7, 8. The magnets 21 on the turntable 2 are relatively close or juxtaposed to the under side of the glass plate 4. This brings the magnets 22 on the figures relatively close to the magnets 21 on the turntable and, hence, when the magnets are arranged one above the other as shown in Fig. 4 with their unlike poles in opposition, the attractive force between the magnets will cause the magnets on the figures to follow the magnets on the turntable in the rotation of the latter. The figures travel in the circular path of the magnets to which they are attracted and the appearance of skating on the ice area 25 is produced. Due to the magnetic flux of the magnets, a figure will attach itself to a magnet on the turntable as soon as the figure is placed within the range of the magnetic field of a magnet on the turntable. In this way, the figures will take their positions on being placed on the plate 4 and no boundary lines or markings are required on the plate to locate the figures. With the magnets 21 fixed on the turntable in defined paths about the axis of rotation of the turntable and their poles arranged as shown, the position and direction of travel of the figures over the plate 4 will be definitely determined for each row of magnets. For the outer row, the figures when attached to said magnets will face in the direction of rotation of the turntable and have a forward movement. For the inner row, the figures will face in the reverse direction and appear to skate backward. This is due, of course, to the north poles of the magnets 21a of the outer row facing in the direction of rotation of the turntable and the similar poles of the magnets 21b of the inner row facing against said direction of rotation.

It will be observed from Fig. 2 that the magnets in each row are substantially equal in length and further that the magnets in each row are spaced apart circumferentially slightly greater distances than the length of an individual magnet. The purpose of this is to provide a fairly large number of permanent magnets in each row whereby a large number of display figures may be used in a row and also quickly pick up a display figure when it is placed on the plate 4 within the magnetic field of any of the magnets of the row. Also, in having the magnets of each row spaced as described there is no opportunity afforded for the display figures remaining idle in the spaces between the magnets of the row. When in this space the magnet on the figure is within the influence of the adjacent magnet in the row and will be quickly attracted to it. In having both the turntable and the display figures provided with permanent magnets the attractive force between the magnets is doubled and hence, the display figures will not only be held against the supporting surface 4 in an upright or display position, but will be caused to be moved over said surface with a sliding action in keeping with the rotation imparted by the turntable. The advantage of this is that there is no likelihood of a display figure becoming accidentally out of the influence of a magnet of a row or remaining inadvertently idle or stationary.

When a display figure is provided with two permanent magnets in side by side relation or two figures are so arranged as indicated at 22a, 22b in Fig. 5, a whirling or waltzing motion will be imparted to the display figure in the rotation of the turntable 2. In Fig. 1, I have shown the display figure 8 as consisting of two independent figures joined or connected together at their magnets 22, 22 in side by side relation by the mutual magnetic attraction between said magnets. To give these figures unity so that they may be picked up and handled as one, the arm portions of the figures may be joined as shown. When a figure of this type is placed on the supporting plate 4 over a row of the permanent magnets 21 on the turntable the action is as follows:

It will be observed from Fig. 5 that the two magnets 22a, 22b provide opposite poles at each end of the double magnet. Now when this double magnet comes within the magnetic fields of a row of permanent magnets 21 on the turntable, the figures will be turned about a vertical axis in passing from one magnet to another. The progression or travel of the joined figures over the plate 4 is usually in the direction of rotation of the turntable. I have attempted to illustrate this action in Fig. 5.

Referring now to this figure: The joined magnets 22a, 22b are shown in full lines over a magnet 21b on the turntable after the joined magnets have passed from the next preceeding turntable magnet 21b to the right in Fig. 5. Taking the joined magnets at the starting position as indicated in dotted lines it will be noted that the magnet 22a is directly above the magnet 21b on the turntable. These magnets are attracted together by reason of the mutual attraction between them inasmuch as the north pole of the magnet 22a is opposite the south pole of the magnet 21b. This locates the north and south poles of these magnets in opposition as indicated in Fig. 5. The magnet 22b is within the repelling action of the magnet 21b because the like poles of these magnets are opposed as shown. Due to the repelling action just referred to and the fact that the north pole of the magnet 22b faces the south pole of the next adjacent magnet 21b on the turntable to the rear of the joined magnets, the latter will be caused to be turned about a vertical axis in the rotation of the turntable. This turning takes place in the space between the turntable magnets 21b as indicated by the joined magnet representation b in Fig. 5. The magnet 22b is now attracted to the next adjacent turntable magnet 21b to the left as viewed in Fig. 5 and the magnet 22a is now within the repelling force of said turntable magnet. These counter forces tend to make somewhat unstable the attraction between the figure and the turntable magnets of opposite poles with the result that the joined magnets may move from one turntable magnet to another causing the rotation referred to. This gives the figures 8 a whirling or waltzing action over the plate 4. This action may be irregular at times because of the fact that the joined magnets have a free sliding support on the top of the glass plate 4 which is smooth. There may be some friction and some displacement of the joined magnets out of the central path of the magnets 21b. This will effect the position of the magnets 22a, 22b with respect to the turntable magnets and the repelling or attracting forces of the magnets might not be sufficient to cause the figure to turn at each magnet 21b. This displacement is not objectionable, in fact, it adds to the animation of the display in that the turning or waltzing action is not confined to any definite pattern.

In practice, it is preferable to have the whirling or waltzing action confined to the inner circle of the magnets on the turntable whereas the individual figures are located at the outer circle. This prevents the turning action of the joined figures over the glass plate 4 hindering the continuous forward movement of the single figures in the outer row. With the poles of the magnets of one row reversed as to the poles of the magnets of the other row as shown in Fig. 2, any of the individual figures 7 may be made to skate backwards by applying them to the inner row of magnets 21b.

In Fig. 6 I have shown a modified form of turntable construction. In this embodiment I propose to make the turntable 26 of a relatively light paper stock material of the character of double faced corrugated board. The permanent magnets 27 are set in recesses 28 provided on the upper side of this turntable. These recesses extend through the upper layer 29 and the adjacent corrugated layer 30 of the board as indicated in Fig. 6. The lower layer 31 of the board provides a support for the lower sides of the permanent magnets 27. It is to be understood that the recesses 28 completely surround their respective magnets as indicated by the dotted line in Fig. 6. Also the magnets fit sufficiently tight in the recesses so as to be held from displacement.

In Fig. 7 I have shown the same arrangement as in Fig. 6 with the addition of a thin paper stock layer 32 between the under side of the glass supporting plate 4a and the turntable 26. The protective layer 32 covers the magnets 27 on the turntable and prevents any possibility of abrasion between the magnets and the glass plate 4a should the turntable structure come in contact with the plate.

In Fig. 8 I have shown my invention applied to a display in which the supporting medium for the display figures is in the form of a body of liquid. This may be water, in which case the display device is constructed to provide a holding trough 33 for the liquid 34. The trough is made of a non-magnetic material and may conform to the path of the movement of the display figures as created by the rotatable turntable 35 which is located below the trough as shown. The turntable 35 will be power driven and is provided on its upper surface beneath the trough with a desired number and arrangement of permanent bar magnets, one of which is shown at 36 in Fig. 8. The display figure will have a form associated with a water display. In Fig. 8 I have shown a display figure 37 in the form of a water fowl. The figure is constructed to float on the surface of the water with its permanent magnet 38 in contact with or relatively close to the bottom wall 39 of the trough. This locates the magnets 36, 38 within mutual attraction of one another and the display figure 37 is moved around with the turntable as in the display device first described.

It is to be understood that my invention is applicable to display devices for advertising in any desired form of merchandising. I have shown my invention applied to the ice skating field, but naturally do not wish to be limited or restricted thereto. Moreover, the details of construction and arrangement of parts shown and described may be variously changed and modified without departing from the spirit and scope of my invention.

I claim as my invention:

1. In a device of the character described, comprising in combination with a display figure, a non-magnetic supporting plate for said figure, a turntable located below the plate and turnable about an axis substantially normal thereto, permanent bar magnets carried by the figure and and the turntable, respectively, for holding the figure in its display position on the plate and causing the figure to be slid over the plate in response to the rotary movement of the turntable, there being a plurality of magnets on the turntable arranged in a defined path about the axis of rotation of the turntable and disposed with the poles of said magnets of one sign facing in the direction of rotation of the turntable and the poles of the opposite sign facing in the reverse direction, there being a pair of permanent bar magnets on the figure to slidably support the figure on the plate, said magnets being joined together in side by side relation with the poles of said magnets of opposite sign at the opposite ends of the joined magnets to impart a whirling or turning movement to the figure to simulate waltzing in response to the attraction and repulsion forces set up between the magnets on the figure and on the turntable as the like and unlike poles of said magnets are brought into opposition in the travel of the figure over the plate from one turntable magnet to another, and means for rotating the turntable.

2. In a device of the character described, comprising in combination with a display figure, a non-magnetic supporting plate for said figure, a turntable located below the plate and turnable about an axis substantially normal thereto, permanent bar magnets carried by the figure and the turntable, respectively, for holding the figure in its display position, on the plate and causing the figure to be slid over the plate in response to the rotary movement of the turntable, there being a plurality of magnets on the turntable arranged in a circular row about the axis of rotation of the turntable and disposed with the poles of said magnets all of one sign facing in the direction of rotation of the turntable and the poles of the opposite sign facing in the reverse direction, there being a pair of permanent bar magnets on the figure to slidably support the figure on the plate, said magnets being joined together in side by side relation by their mutual magnetic attraction with the poles of said magnets of opposite sign at the opposite ends of the joined magnets to impart a whirling or turning movement to the figure to simulate waltzing in response to the attraction and repulsion forces set up between the magnets on the figure and on the turntable as the like and unlike poles of said magnets are brought into opposition in the travel of the figure over the plate from one turntable magnet to another, and means for rotating the turntable, the magnets on the turntable being circumferentially spaced slightly greater distances than the length of the joined magnets on the figure to provide for the turning movement of the figure in the spaces between the turntable magnets.

3. In a device of the character described, comprising in combination with a display figure, a non-magnetic supporting plate for said figure, a series of permanent bar magnets located below the plate and constrained for movement in fixed positions in a defined path beneath the plate, said magnets being spaced apart in the direction of their unitary movement with their poles all of one sign facing in the direction of such movement and their poles of the opposite sign facing in the reverse direction, a pair of permanent bar magnets for the figure and providing a sliding support therefor on the plate, the magnets on the figure being joined together in side by side relation by their mutual magnetic attraction with the poles of said magnets of opposite sign at the opposite ends of the joined magnets to impart a whirling or turning movement to the figure to simulate waltzing in response to the forces of attraction and repulsion set up between the magnets on the figure and the magnets beneath the plate as the like and unlike poles of said magnets are brought into opposition in the sliding of the figure over the plate, and means for imparting unitary movement to the magnets beneath the plate.

4. A display figure for use in a device of the character described, comprising two individual figures each having a supporting base comprising a single permanent bar magnet and each being distinct in respect to its display characteristics, two of such units being attached by the mutual attraction of the bar magnets of the two figures when said bar magnets are placed together in side by side relation with the poles of said magnets of opposite sign at the opposite ends of the figure reversely positioned whereby to provide a composite figure composed of the individual figures to simulate a joint act when set in motion.

ALBERT W. SMITH.